Patented Apr. 23, 1940

2,197,846

UNITED STATES PATENT OFFICE 2,197,846

ACID PYRONINE DYESTUFFS

Paul Herbert Wolff, deceased, late of Frankfort-on-the-Main-Hochst, Germany, by Richard Wenzel, administrator, Frankfort - on - the-Main-Hochst, Germany, and Karl Frank, Frankfort-on-the-Main-Hochst, Germany, assignors to General Aniline & Film Corporation, a corporation of Delaware No Drawing. Application September 29, 1938, Serial No. 232,303. In Germany November 4, 1937

3 Claims. (Cl. 260—319)

The present invention relates to acid pyronine dyestuffs.

We have found that acid pyronine dyestuffs are obtainable by condensing a 3.6-dihalogen-xanthone with an isocyclic or heterocyclic secondary or tertiary amine, then exchanging the halogen atoms in 3- and 6-positions for the radicals of an aromatic amine and sulfonating the dyestuffs thus obtained. There are obtained new acid dyestuffs, for instance, those of the following general formula

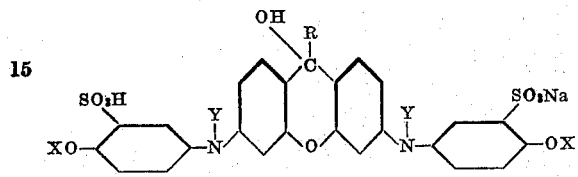

wherein X represents an alkyl group, Y hydrogen or the methyl group and R a member of the group consisting of indole radicals and N-alkyl substituted aniline radicals. The new dyestuffs dye animal fibers violet tints of good properties of fastness.

The following examples serve to illustrate the invention, but they are not intended to limit it thereto, the parts being by weight:

1. 13.3 parts of 3.6-dichloroxanthone, 10.0 parts of n-butylethyl-meta-toluidine, 10 parts of phosphorus oxychloride and 8 parts of zinc chloride are together boiled with 75 parts of toluene in a reflux apparatus until hydrochloric acid is no longer evolved. The condensation product which has separated is freed from the toluene and melted together with 50 parts of para-phenetidine at 100° C. for two hours. The violet dyestuff thus obtained is freed from the excess of base by stirring it with dilute hydrochloric acid and after drying, sulfonated to form the disulfonic acid by heating it with sulfuric acid monohydrate at 30° C. for several hours (for instance, for 4 hours). This dyestuff in the form of the sodium salt dyes wool and silk clear violet tints of good properties of fastness. It has probably the following constitution:

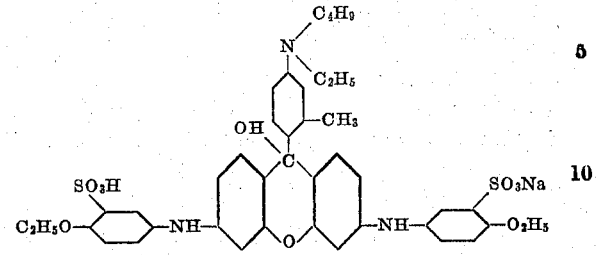

The 3.6-dichloroxanthone of the formula:

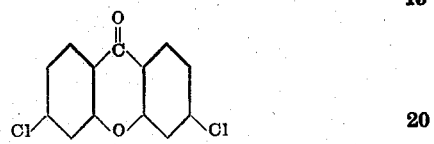

may be prepared as follows:

191 parts of 2.4-dichlorobenzoic acid, 130 parts of metachlorophenol and 120 parts of caustic potash are together heated, while stirring, at 195° C. in the presence of 80 parts of methanol, during which operation the methanol, serving as melting agent, distils. After further heating for ¼ hour at 195° C. water is added, the mass is acidified and unchanged meta-chlorophenol removed by means of steam. The 5.5'-dichlorodiphenyl ether-2-carboxylic acid at first obtained is heated in ten times its weight of concentrated sulfuric acid for 1 hour at about 95° C. Thereby ring-closure to form the 3.6-dichloroxanthone occurs; this product is separated by pouring the mass on ice and may be purified by recrystallization from alcohol or methanol.

2. By using in the process of Example 1 instead of the n-butyl-ethyl-meta-toluidine 8.2 parts of n-butyl-ortho-toluidine a violet dyestuff of similar properties is obtained.

3. By exchanging in the process of Example 1 the n-butyl-ethyl-meta-toluidine 10.5 parts of 1-methyl-2-phenyl-indol and otherwise proceeding as indicated in Example 1, a violet dyestuff of similar properties is obtained.

4. By condensing 13.3 parts of 3.6-dichloro-xanthone with 16 parts of 1-isobutyl-2-para-chlorophenyl-4.6-dimethylindol in the presence of zinc chloride and phosphorus oxy-chloride in toluene, in a manner analogous to that indicated in Example 1, a product is obtained which when melted with 50 parts of N-methyl-para-anisidine at 110° C. and subsequently sulfonated (as described in Example 1) yields a dyestuff which, in the form of the sodium salt, dyes wool and silk violet tints of good properties of fastness. The dyestuff has probably the following constitution:

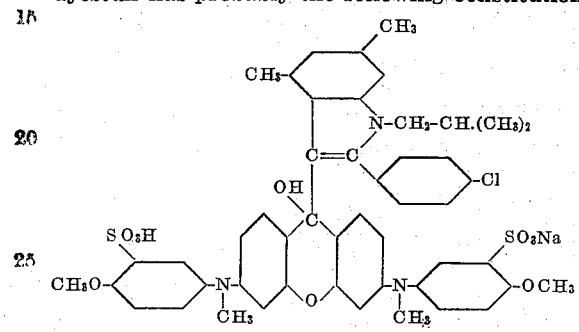

We claim:
1. The compounds of the general formula:

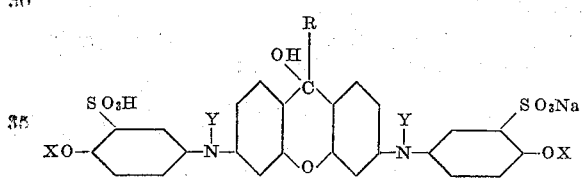

wherein X represents an alkyl group, Y a member of the group consisting of hydrogen and methyl and R an indole radical, being acid dyestuffs yielding on animal fibers violet tints of good fastness properties.

2. The compound of the formula:

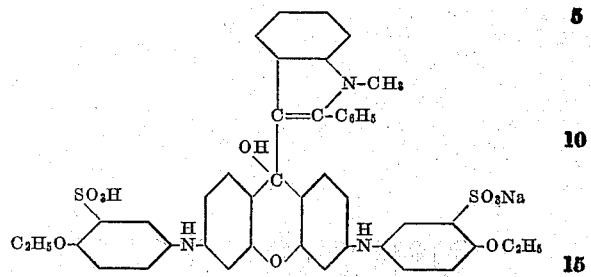

being a dyestuff which dyes wool and silk pure violet tints of good fastness properties.

3. The compound of the formula:

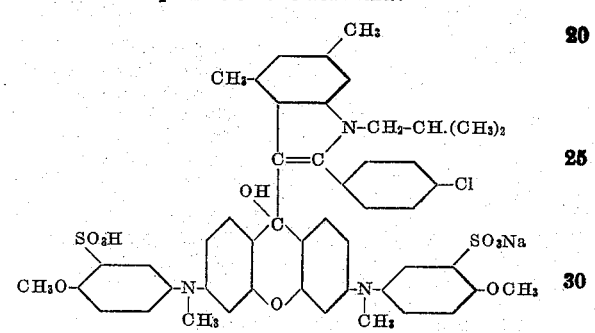

being a dyestuff which dyes wool and silk pure violet tints of good properties of fastness.

RICHARD WENZEL,
Administrator of Paul Herbert Wolff, Deceased.

KARL FRANK.